(12) United States Patent
Baek et al.

(10) Patent No.: US 9,088,890 B2
(45) Date of Patent: *Jul. 21, 2015

(54) METHOD AND APPARATUS FOR ENCRYPTING SHORT DATA IN A WIRELESS COMMUNICATION SYSTEM

(71) Applicant: Samsung Electronics Co., Ltd, Gyeonggi-do (KR)

(72) Inventors: Young-Kyo Baek, Seoul (KR); Hyun-Jeong Kang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/149,724

(22) Filed: Jan. 7, 2014

(65) Prior Publication Data

US 2014/0126721 A1 May 8, 2014

Related U.S. Application Data (63) Continuation of application No. 13/347,628, filed on Jan. 10, 2012, now Pat. No. 8,625,798.

(30) Foreign Application Priority Data

Jan. 10, 2011 (KR) ........................ 10-2011-0002474

(51) Int. Cl.
*H04L 9/00* (2006.01)
*H04W 12/04* (2009.01)
*H04L 29/06* (2006.01)
*H04W 12/02* (2009.01)
*H04W 12/10* (2009.01)

(52) U.S. Cl.
CPC ........... *H04W 12/04* (2013.01); *H04L 63/0428* (2013.01); *H04W 12/02* (2013.01); *H04L 63/123* (2013.01); *H04W 12/10* (2013.01)

(58) Field of Classification Search
CPC ............ H04L 2209/80; H04L 63/0428; H04L 63/123; H04W 4/14; H04W 4/12; H04W 12/02; H04W 12/04; H04W 12/10
USPC .......................................... 380/270; 455/466
See application file for complete search history.

(56) References Cited

U.S. PATENT DOCUMENTS

| | | | |
|---|---|---|---|
| 8,625,798 B2 * | 1/2014 | Baek et al. ..................... 380/270 |
| 2008/0279381 A1 | 11/2008 | Narendra et al. |
| 2009/0280774 A1 | 11/2009 | Patet et al. |
| 2009/0307496 A1 | 12/2009 | Hahn et al. |
| 2010/0069097 A1 * | 3/2010 | Chin et al. ..................... 455/466 |
| 2010/0205442 A1 | 8/2010 | Han et al. |
| 2011/0302416 A1 | 12/2011 | Hoshen et al. |

* cited by examiner

*Primary Examiner* — Matthew Smithers (57) ABSTRACT

A method and apparatus is capable of encrypting short data in a wireless communication system When a terminal generates a short data burst in idle mode, the apparatus generates a Traffic Encryption Key (TEK) using a Cipher-based Message Authentication Code (CMAC)-TEK prekey derived from an Authorization Key (AK) related to Security Association (SA) between the terminal and a Base Station (BS). A nonce is constructed with a Packet Number (PN) identical to an uplink CMAC PN (CMAC-PN_U) transmitted together with a Ranging Request (RNG-REQ) message carrying the short data burst The short data burst is encrypted using the TEK and the nonce. A Medium Access Control (MAC) Protocol Data Unit (PDU) is generated by attaching a MAC header and a CMAC digest for integrity protection to the RNG-REQ message carrying the encrypted short data burst. The MAC PDU is transmitted to the BS.

28 Claims, 6 Drawing Sheets

METHOD AND APPARATUS FOR ENCRYPTING SHORT DATA IN A WIRELESS COMMUNICATION SYSTEM

CROSS-REFERENCE TO RELATED APPLICATION(S) AND CLAIM OF PRIORITY

The present application is a continuation of U.S. patent application Ser. No. 13/347,628 filed Jan. 10, 2012, which is related to and claims priority under 35 U.S.C. §119(a) to a Korean Patent Application filed in the Korean Intellectual Property Office on Jan. 10, 2011 and assigned Korean Patent Application Serial No. 10-2011-0002474. The present application claims priority to both U.S. patent application Ser. No. 12/082,398 and Korean Patent Application Serial No. 10-2007-0036670, the contents of both of these applications are incorporated herein by reference.

TECHNICAL FIELD OF THE INVENTION

The present invention relates to a wireless communication system, and more particularly, to a method and apparatus for encrypting a short data burst.

BACKGROUND OF THE INVENTION

A cellular wireless communication system such as a Code Division Multiple Access (CDMA) $3^{rd}$ Generation Partnership Project (3GPP) Long Term Evolution (LTE) system, a Worldwide interoperability for Micro Wave Access (WiMAX) system, and the like, provides a variety of services to Mobile Stations (MSs). The drastic development of computer, electronics, and communication technologies is a driving force behind provisioning of diverse wireless communication services through a wireless communication network. The most basic wireless communication service is a wireless voice call service that enables MS users to conduct voice calls wirelessly irrespective of time and place. A wireless Internet service is also provided, which enables users to conduct data communication through the Internet over a wireless communication network at any place while they are moving.

Especially, Short Messaging Service (SMS) delivers text messages of a limited length between MSs irrespective of the communication state of a receiving MS, in other words, between MSs in idle modes. In general, the SMS limits a text message to about 80 bytes on a liquid crystal screen. Now, the use rate of the SMS is soaring, from personal usages to business usages. Beyond simple message exchanges between individual persons, the SMS has recently found its use in a wide range of group messaging, scheduled message transmission, e-mail reception notification, personal credit information management, financial information notification, and the like.

The growing use and importance of the SMS has increased the necessity of SMS security. Especially when a text message carries personal credit information or financial information, SMS security is very important. Accordingly, there exists a need for a specific technique for encrypting a short data burst transmitted by a terminal in order to protect SMS security.

SUMMARY OF THE INVENTION

To address the above-discussed deficiencies of the prior art, it is a primary object to provide at least the advantages described below.

Accordingly, an aspect of embodiments of the present disclosure is to provide a method and apparatus for encrypting short data transmitted in idle mode in a wireless communication system.

Another aspect of embodiments of the present disclosure is to provide a method and apparatus for encrypting short data transmitted by an idle mode terminal in a wireless communication system.

A further aspect of embodiments of the present disclosure is to provide a method and apparatus for encrypting short data to be encapsulated in a Ranging Request (RNG-REQ) message in a wireless communication system.

In accordance with an embodiment of the present disclosure, there is provided a method for encrypting short data at a terminal in a wireless communication system, in which a short data burst is generated in idle mode, a Traffic Encryption Key (TEK) is generated using a Cipher-based Message Authentication Code (CMAC)-TEK prekey derived from an Authorization Key (AK) related to Security Association (SA) between the terminal and a Base Station (BS), the AK being acquired in advance through authentication during initial network entry, a nonce is constructed with a Packet Number (PN) identical to an uplink CMAC PN (CMAC-PN_U) transmitted together with a Ranging Request (RNG-REQ) message carrying the short data burst, the short data burst is encrypted using the TEK and the nonce, a Medium Access Control (MAC) Protocol Data Unit (PDU) is generated by attaching a MAC header and a CMAC digest for integrity protection to the RNG-REQ message carrying the encrypted short data burst, and the MAC PDU is transmitted in a radio signal to the BS. The CMAC-PN_U is included in the CMAC digest.

In accordance with another embodiment of the present disclosure, there is provided a method for decrypting short data at a BS in a wireless communication system, in which a MAC PDU that includes an RNG-REQ message including an encrypted short data burst, a MAC header, and a CMAC digest for integrity protection is received from a terminal in idle mode, a TEK is generated using a CMAC-TEK prekey derived from an AK related to SA between the terminal and the BS, a nonce is constructed with a PN identical to an uplink CMAC PN (CMAC-PN_ U) transmitted together with the RNG-REQ message, and the encrypted short data burst is decrypted using the TEK and the nonce. The CMAC-PN_U is included in the CMAC digest.

In accordance with another embodiment of the present disclosure, there is provided a terminal apparatus for encrypting short data in a wireless communication system, in which a generator generates a short data burst in idle mode, an encryptor generates a TEK using a CMAC-TEK prekey derived from an AK related to SA between the terminal and a BS, the AK being acquired in advance through authentication during initial network entry, constructs a nonce with a PN identical to an uplink CMAC PN (CMAC-PN_U) transmitted together with an RNG-REQ message carrying the short data burst, and encrypts the short data burst using the TEK and the nonce, and a transmitter generates a MAC PDU by attaching a MAC header and a CMAC digest for integrity protection to the RNG-REQ message carrying the encrypted short data burst, and transmits the MAC PDU in a radio signal to the BS. The CMAC-PN_ U is included in the CMAC digest.

In accordance with a further embodiment of the present disclosure, there is provided a BS apparatus for decrypting short data in a wireless communication system, in which a receiver receives a MAC PDU that includes an RNG-REQ message including an encrypted short data burst, a MAC header, and a CMAC digest for integrity protection from a terminal in idle mode, and a decryptor generates a TEK using a CMAC-TEK prekey derived from an AK related to SA between the terminal and the BS, constructs a nonce with a PN identical to an uplink CMAC PN (CMAC-PN_U) transmitted together with the RNG-REQ message, and decrypts the encrypted short data burst using the TEK and the nonce. The CMAC-PN_U is included in the CMAC digest.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. A detailed description of known functions and operations will not be given lest it should obscure the subject matter of the present disclosure.

The following description is given with the appreciation that a Short Messaging Service (SMS) operation is performed in conformance to the Institute of Electrical and Electronics Engineers (IEEE) 802.16e/m standard in a wireless cellular communication system. However, the present disclosure is not limited to the specific communication protocol or system configuration and thus it is obvious to those skilled in the art that many modifications and variations can be made within the scope and spirit of the present disclosure.

Figure 1:
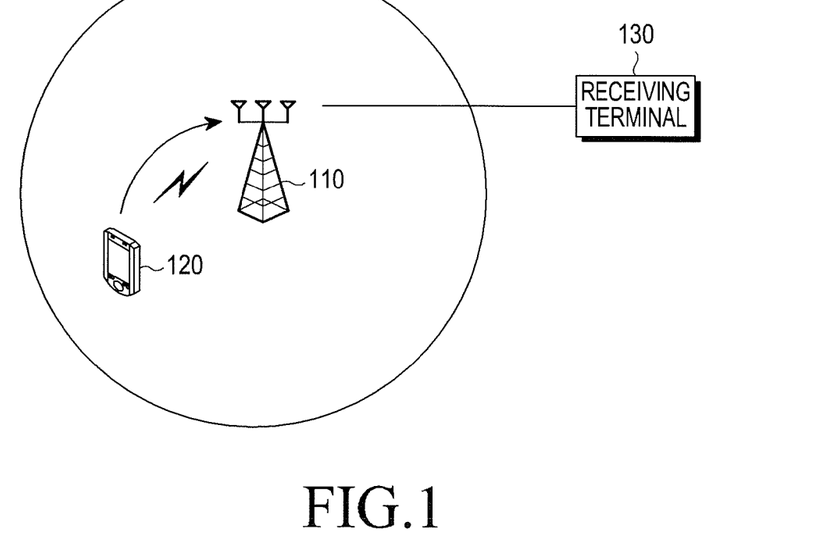
FIG. 1 illustrates short data transmission according to an embodiment of the present disclosure.

FIG. 1 illustrates short data transmission according to a preferred embodiment of the present disclosure. Referring to FIG. 1, a Mobile Station (MS) 120 within the cell area of a Base Station (BS) 110 transmits an intended text message in a radio signal to the BS 110 and the BS 110 transmits the text message to a receiving terminal 130. The receiving terminal 130 can be another cellular MS, a PC, and the like. In the IEEE 802.16m standard, the BS 110 and the MS 120 are called an Advanced BS (ABS) and an Advanced MS (AMS), respectively, and an air interface between the ABS and the AMS is called an Advanced Air Interface (AAI).

If an MS willing to transmit a text message is conducting a call, that is, it is in active mode, the text message is encrypted and transmitted in a traffic message. Alternatively, if the MS is not conducting a call, that is, it is in idle mode, the text message is carried in a message transmittable without network reentry in the idle mode, for example, in an AAI Ranging Request (AAI_RNG-REQ) message conforming to the IEEE 802.16m standard. Similarly, a text message directed to an idle-mode MS is transmitted in an AAI Ranging Response (AAI_RNG-RSP) message.

When generating short data in the idle mode, a terminal transmits the short data burst, that is, SMS payload in an RNG-REQ message used for location update without network reentry, thereby save power.

Figure 2A:
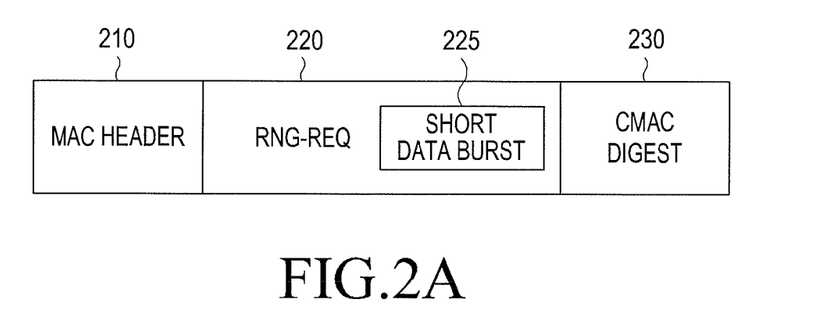
FIG. 2A illustrates a typical format of a Medium Access Control (MAC) Protocol Data Unit (PDU) including a Ranging Request (RNG-REQ) message.

FIG. 2A illustrates a typical format of a Medium Access Control (MAC) Protocol Data Unit (PDU) including an RNG-REQ message.

Referring to FIG. 2A, the MAC PDU includes a MAC header 210, payload 220 including an RNG-REQ message, and a Cipher-based Message Authentication Code (CMAC) Digest 230 for error check and integrity protection. If the RNG-REQ message is used for SMS transmission, a short data burst 225 is encapsulated in the payload 220. The CMAC Digest 230 includes a PMK_SN and a CMAC-PN_U related to Security Association (SA) between a BS and the terminal and a CMAC value calculated for the RNG-REQ message, for integrity protection of the RNG-REQ message.

The PMK_SN is the Serial Number (SN) of a Pairwise Master Key (PMK) to verify the integrity of the RNG-REQ message. The CMAC-PN_U is a CMAC Packet Number (PN) used on an Uplink (UL).

Specifically, a UL or Downlink (DL) CMAC PN is the CMAC SN of a UL or DL control message. The UL or DL CMAC PN is a sequential counter that is incremented for each MAC control message containing a CMAC Tuple or CMAC Digest in the context of a UL or DL message. The CMAC PN is a part of an Authorization Key (AK) context acquired in an authentication procedure between the BS and the MS, unique for each MAC control message (such as, an RNG-REQ message) protected by a CMAC.

The MAC PDU format illustrated in FIG. 2A supports the integrity protection of the RNG-REQ message, but not encryption of the short data burst 225.

Figure 2B:
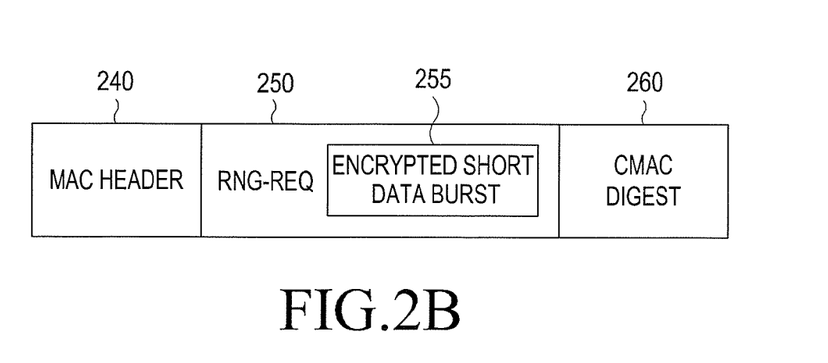
FIG. 2B illustrates a format of a MAC PDU including an encrypted short data burst according to an embodiment of the present disclosure.

FIG. 2B illustrates a format of a MAC PDU including an encrypted short data burst according to a preferred embodiment of the present disclosure.

Referring to FIG. 2B, the MAC PDU includes a MAC header 240, payload 250 including an RNG-REQ message, and a CMAC Digest 260 for error check and integrity protection. Especially, an encrypted short data burst 255 is encapsulated in the payload 250. As in FIG. 2A, the CMAC Digest 260 includes a PMK_SN, a CMAC-PN_U, and a CMAC value calculated for the RNG-REQ message.

In accordance with an embodiment of the present disclosure, the short data burst 255 can be encrypted in an Advanced Encryption Standard with Counter mode (AES-CTR) encryption scheme. AES-CTR is one of encryption schemes supported by the IEEE 802.16m standard, in which text is encrypted without integrity verification. That is, since the integrity of the entire RNG-REQ message is ensured by the CMAC Digest 260, a change in the size of the MAC PDU can be minimized by encrypting the short data burst 255 through AES-CTR.

The AES-CTR scheme needs inputs of a Traffic Encryption Key (TEK) and a nonce N. The TEK is derived from a CMAC-TEK prekey which is generated using a Master Session Key (MSK) and an AK derived from the MSK. The terminal can acquire the MSK in an authentication procedure when it initially accesses the network, that is, during network entry and initialization.

For example, the TEK can be derived by:

$$TEK = Dot16KDF(CMAC\text{-}TEKprekey, SAID|COUNTER\_TEK=0|TEK,128) \quad [\text{Eqn. 1}]$$

where Dot16KDF represents a predetermined key derivation function, SAID is an SA identification that identifies the SA between the BS and the terminal, and COUNTER_TEK is a counter value used to derive different TEKs from the same SAID. The SAID and COUNTER_TEK can be preset. For example, the SAID is set to 0x02 and the COUTNER_TEK is set to 0. A TEK generated based on the CMAC-TEK prekey, SAID=0x02, and COUNTER_TEK=0 is used for encryption of the short data burst 255.

The nonce N is constructed using a PN, for example, as illustrated in Table 1.

TABLE 1

| | Byte Number | | | |
|---|---|---|---|---|
| | 0-1 | 2-3 | 4-9 | 10-12 |
| Field Name | Short data burst length | STID and Flow ID | Reserved | EKS and Packet Number |
| Contents | Short data burst length | STID \| FID | 0x000000000000 | 00 \| CMAC_PN_U |

Referring to [Table 1], the first two bytes of the nonce is filled with the length of the short data burst. If the Station ID (STID) and the Flow ID (FID) have not been assigned for a service flow of the terminal, STID and FID fields is set to all zeros (0's). The Encryption Key Sequence (EKS) field is filled with 0's and the PN used to construct the nonce is set to the same value as the CMAC-PN_U to be sent with the RNG-REQ message. The reason for using the CMAC-PN_U is that the RNG-REQ message does not have a PN, unlike a traffic MAC PDU.

In an alternative embodiment, the RNG-REQ message can include an encryption indicator indicating whether the short data burst 255 is encrypted or not. The encryption indicator is 1 bit long, indicating whether the short data burst encapsulated in the RNG-REQ message is encrypted. [Table 2] below illustrates an exemplary format of an RNG-REQ message including the encryption indicator.

TABLE 2

| Field | Size (bits) | Value/description | condition |
|---|---|---|---|
| Ranging purpose indication | 4 | ·······<br>·····<br>0b0011 = Idle mode location update<br>····· | |
| CMAC indicator | 1 | Indicate whether this message is protected by CMAC tuple<br>0b0: not protected<br>0b1: protected | |
| SMS encryption indicator | 1 | Indicate whether this SMS is encrypted<br>0b0: not encrypted<br>0b1: encrypted | |
| SMS | Variable | Short Message content up to 140 bytes | May be presented when there is SMS content to be sent |

In [Table 2], the Ranging purpose indication indicates the purpose of the RNG-REQ message. If the RNG-REQ message is used to transmit a short data burst, the Ranging purpose indication can be set to 0b0011. The CMAC indicator is a 1-bit field indicating whether the RNG-REQ message is protected by a CMAC and the SMS encryption indicator is a 1-bit field indicating whether the short data burst is encrypted.

Figure 3:
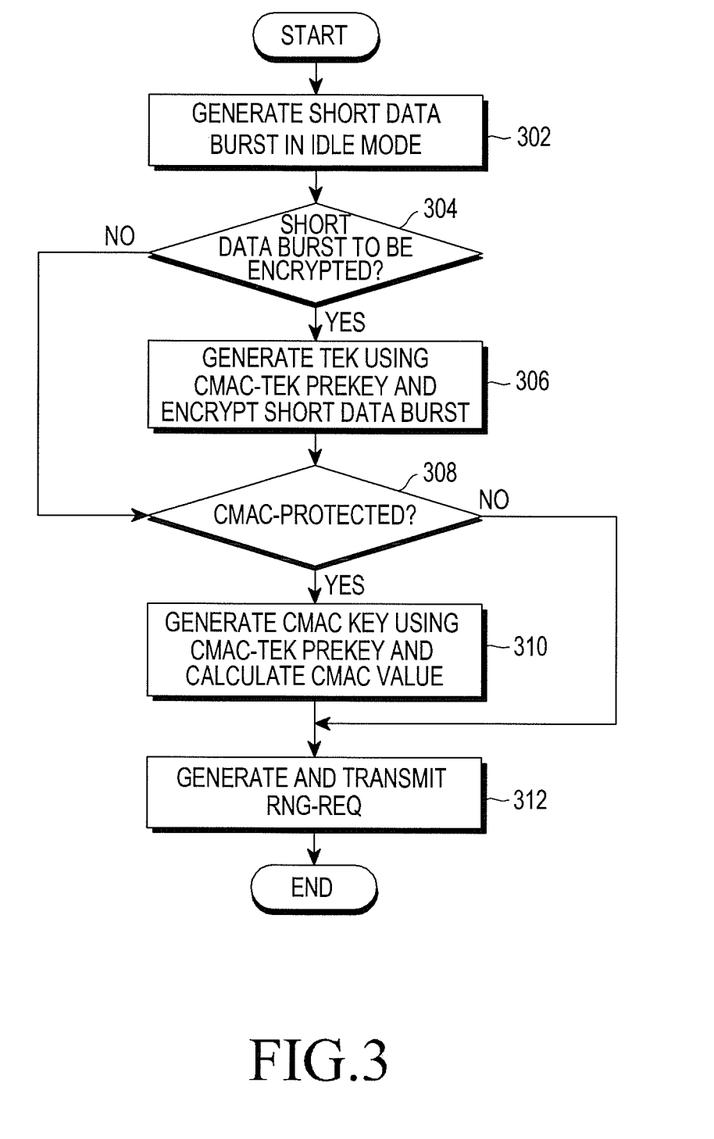
FIG. 3 illustrates a short data encryption operation of a terminal according to an embodiment of the present disclosure.

FIG. 3 is a flowchart illustrating a short data encryption operation of a terminal according to an embodiment of the present disclosure.

Referring to FIG. 3, an idle-mode terminal generates a short data burst to be transmitted to the peer in block 302 and determines whether to encrypt the short data burst in block 304. In example, the determination can be made based on related parameters when the terminal's capabilities are negotiated during initial network entry. In another embodiment of the present disclosure, if it is regulated that a short data burst is always encrypted, block 304 can be omitted. In this case, the procedure jumps from block 302 to block 306. Whether to omit block 304 can be determined according to a used communication standard or selection of a system designer.

If the terminal determines not to encrypt the short data burst in block 304, it jumps to block 308. Alternatively, if the terminal determines to encrypt the short data burst in block 304, the terminal proceeds to block 306. In block 306, the terminal generates a TEK needed for encryption of the short data burst using authorization-related parameters acquired during the initial network entry, that is, a CMAC-TEK prekey generated using an MSK and an AK derived from the MSK, constructs a nonce using the PN of a MAC PDU including an RNG-REQ message in which the short data burst is to be encapsulated, and encrypts the short data burst using the TEK and the nonce. The PN can be set to a CMAC-PN_U included in the MAC PDU.

The terminal determines whether to perform CMAC protection for the RNG-REQ message in which the short data burst will be encapsulated in block 308, which is optional. The determination of block 308 can be made in advance, for example, in the negotiation procedure during the initial network entry. If the terminal determines to perform CMAC protection, the terminal goes to block 310 and otherwise, it jumps to block 312.

In block 310, the terminal generates a CMAC key using the CMAC-TEK prekey and derives a CMAC value from the CMAC key, to be included in a CMAC Digest of the MAC PDU along with the RNG-REQ message. The terminal generates the RNG-REQ message that includes the encrypted short data burst and optionally further includes a CMAC indicator and an SMS encryption indicator, constructs the MAC PDU by adding a MAC header and the CMAC Digest to the RNG-REQ message, and transmits the MAC PDU in a radio signal to a BS in block 312.

Figure 4:
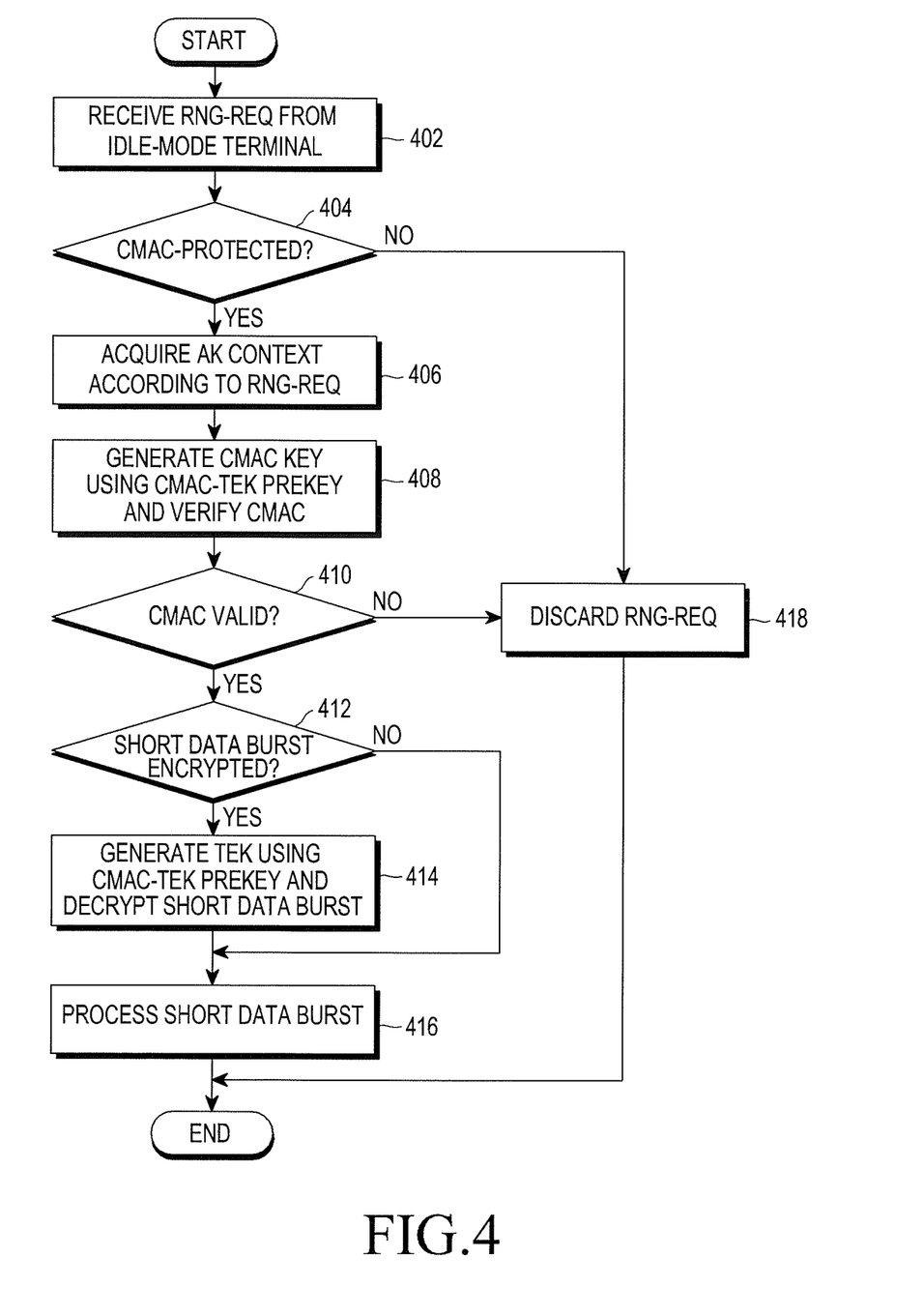
FIG. 4 illustrates a short data decryption operation of a Base Station (BS) according to an embodiment of the present disclosure.

FIG. 4 is a flowchart illustrating a short data decryption operation of a BS according to an embodiment of the present disclosure.

Referring to FIG. 4, the BS receives a MAC PDU including an RNG-REQ message from an idle-mode terminal in block 402 and determines whether the RNG-REQ message is CMAC-protected based on a CMAC indicator included in the RNG-REQ message in block 404. If the CMAC indicator indicates that the RNG-REQ message is CMAC-protected, the BS proceeds to block 406. Otherwise, the BS discards the RNG-REQ message in block 418.

In block 406, the BS acquires an AK context from an authenticator according to information included in the RNG-REQ message in order to authenticate the terminal. If the BS already has the AK context related to the terminal, block 406 may not be performed. The BS then generates a CMAC key using a CMAC-TEK prekey derived from the AK and verifies the CMAC of the RNG-REQ message using the CMAC key in block 408. More specifically, the BS calculates a CMAC value for the RNG-REQ message using the CMAC key and compares the calculated CMAC value with a CMAC value set in a CMAC Digest attached to the RNG-REQ message.

If the CMAC values are equal, the BS determines that the CMAC valuation of the RNG-REQ message is valid in block 410. If the CMAC valuation of the RNG-REQ message is not valid, the BS discards the RNG-REQ message in block 418. Alternatively, if the CMAC valuation of the RNG-REQ message is valid, the BS determines whether a short data burst encapsulated in the RNG-REQ message has been encrypted based on an encryption indicator included in the RNG-REQ message in block 412. If the encryption indicator indicates that the short data burst has not been encrypted, the BS jumps to block 416. If the encryption indicator indicates that the short data burst has been encrypted, the BS proceeds to block 414. In another embodiment of the present disclosure, if it is regulated that a short data burst is always encrypted, an RNG-REQ message does not include an encryption indicator and thus the BS proceeds directly to block 414 without performing block 412.

In block 414, the BS generates the same TEK as used for encryption of the short data burst in the terminal, using the CMAC-TEK prekey, constructs a nonce using a CMAC-PN_U attached to the RNG-REQ message, and decrypts the short data burst encapsulated in the RNG-REQ message using the TEK and the nonce in block 414. In block 416, the BS performs a process including display of the decrypted short data burst.

It may be determined during initialization of a terminal whether the terminal is to encrypt a short data burst. According to an alternative embodiment of the present disclosure, an indicator indicating encryption of a Mobile-Originated (MO) short data burst can be included in a Subscriber Station Basic Capability Request (SBC-REQ) message transmitted by the terminal during its initialization or in a Subscriber Station Basic Capability Response (SBC-RSP) message with which the BS replies to the terminal in response to the SBC-REQ message. In another embodiment of the present disclosure, the indicator can be included in a Registration Request (REG-REQ) message transmitted by the terminal during network registration or in a Registration Response (REG-RSP) message that the BS transmits to the terminal in response to the REG-REQ message.

[Table 3] below illustrates an exemplary format of an SBC-REQ/RSP message or an REG-REQ/RSP message that includes an MO SNS encryption indicator.

TABLE 3

| Field | Size (bits) | Value/description | Condition |
|---|---|---|---|
| MO(mobile-oriented) SMS encryption | 1 | Indicate whether MO SMS can be encrypted 0b0: support encryption 0b1: not support encryption | |

Now a detailed description will be given of the procedures for encrypting and decrypting a short data burst.

Figure 5:
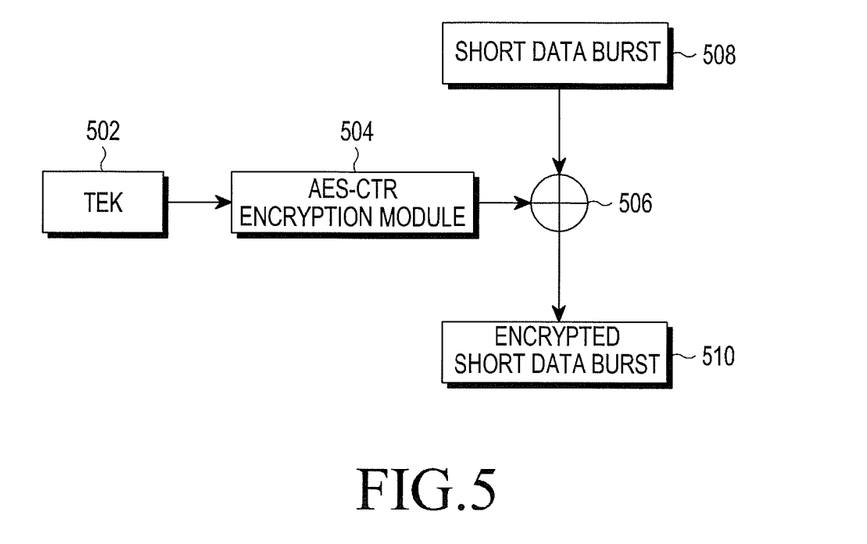
FIG. 5 illustrates a block diagram of a structure for encrypting a short data.

FIG. 5 is a block diagram of a structure for encrypting a short data by AES-CTR. Referring to FIG. 5, an AES-CTR encryption module 504 encrypts an input TEK 502. A combiner 506 combines a short data burst 508 with the encrypted TEK, thus producing an encrypted short data burst 510.

As described before, because the TEK 502 is generated based on parameters known to the BS and the terminal, parameters exchanged through RNG-REQ and RNG-RSP messages, or expectable parameters, the encrypted short data burst 510 is not attached with additional payload such as an EKS and a PN, compared to encrypted traffic data. While a MAC PDU carrying traffic data is encrypted, only the short data burst is encrypted in the process of generating a MAC PDU carrying an RNG-REQ message in the embodiment of the present disclosure.

A procedure for generating a TEK for use in encryption of a short data burst will be described below.

Figure 6A:
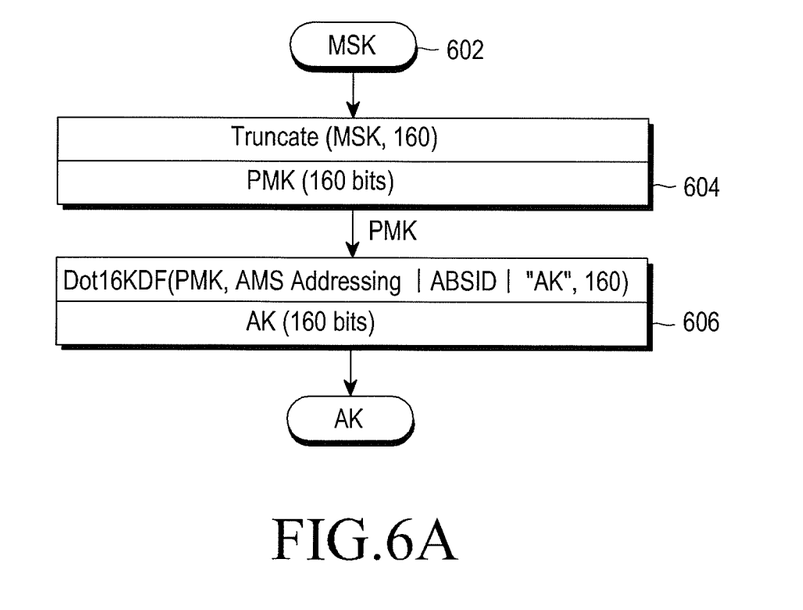
FIGS. 6A and 6B illustrate a procedure for generating a Traffic Encryption Key (TEK) according to an embodiment of the present disclosure.
Figure 6B:
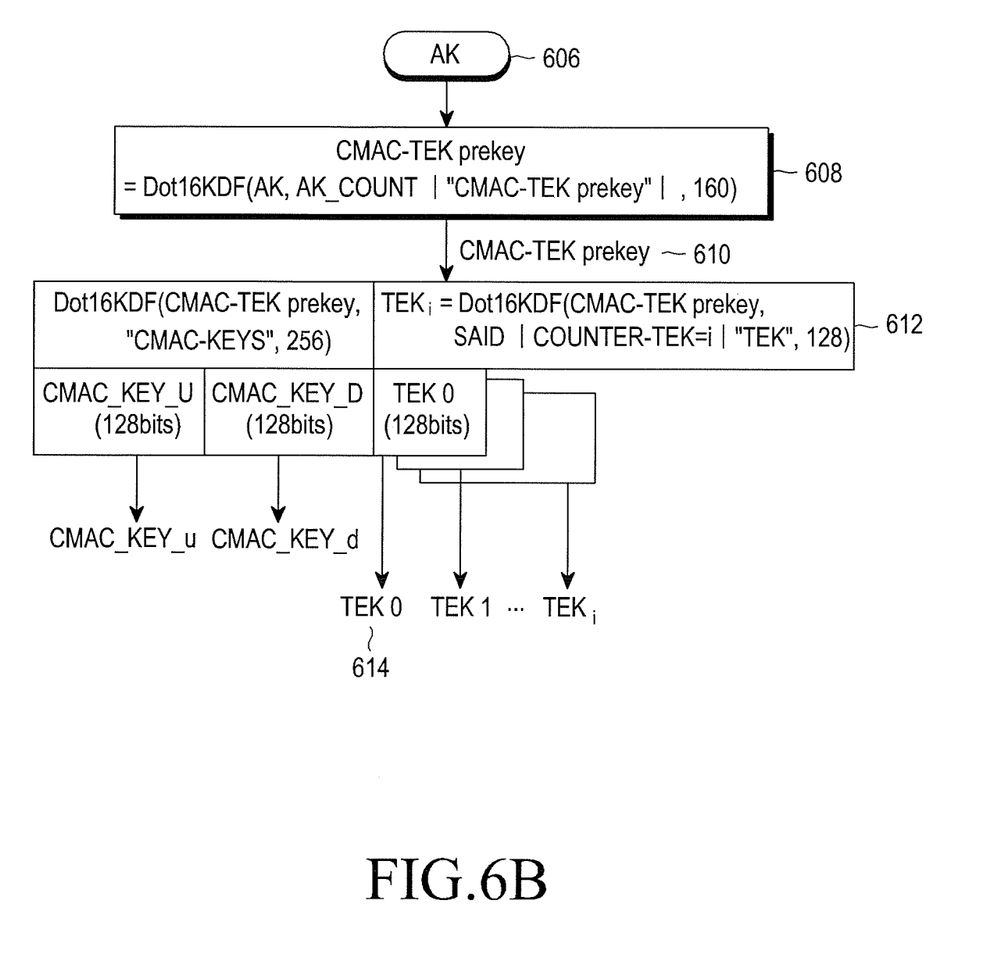

FIGS. 6A and 6B illustrate a procedure for generating a TEK according to an embodiment of the present disclosure.

Referring to FIG. 6A, a 512-bit MSK 602 is generated from an Authentication, Authorization, and Accounting (AAA) server and transmitted to an authenticator during authentication of a terminal. The terminal generates the same MSK as generated in the AAA server during the authentication. The terminal and the authenticator derive a 160-bit PMK 604 by truncating the MSK 602 to 160 bits. The derivation of the PMK 604 from the MSK 602 can be expressed as:

$$PMK=\text{truncate}(MSK,160)$$

If the initial authentication is successful, the BS and the terminal can derive an AK 606 from the PMK 604 in an Extensible Authentication Protocol (EAP)-based authorization procedure and share the AK 606 between them. For example, the AK 606 can be generated by:

$$AK=\text{Dot16KDF}(PMK, AMS\ Address|ABSID|\text{``AK''}, 160)$$

where AMS Address can be the MAC address or MS ID (MSID) of the terminal. The MSID is a random value generated using the MAC address of the MS as a seed. ABSID is the ID of the BS.

Referring to FIG. 6B, a TEK 614 is generated based on the AK 606. Specifically, a CMAC-TEK prekey 610 is generated by performing a KDF using the AK 606. For example, the CMAC-TEK prekey 610 is derived by CMAC-TEK prekey=Dot16KDF(AK,
    AK_COUNT|"CMAC_TEK prekey",160)

where AK_COUNT is a counter value used to ensure that different CMAC keys and TEKs are used for the same BS-terminal pairs.

Then, the 128-bit TEK 614 is generated using the CMAC-TEK prekey 610 as follows.

TEKi=Dot16KDF(CMAC-TEK prekey,
    SAID|COUNTER_TEK=I|"TEK",128)

where SAID is preset, for example, to 0x02 as stated before. The TEK 614, that is, TEK0 generated using SAID=0x02 and COUNTER_TEK=0 is used for encryption of the short data burst.

Besides, a CMAC_KEY_U and a CMAC_KEY_D for the uplink and downlink can be generated using the CMAC-TEK prekey 610, and a CMAC value in a CMAC Digest attached to an RNG-REQ message is generated using the CMAC_KEY_U. For example, the CMAC value is given as CMAC value=Truncate(CMAC(CMAC_KEY_U,AK
    ID|CMAC_PN|STID|FID|24-bit zero
    padding|ASN.1 encoded MAC_Control_Mes-
    sage),64)

where STID is the station identifier of the terminal. If an STID is not assigned to the terminal, the STID can be set to '000000000000'.

AKID identifies an AK for protecting the message, generated as follows, for example.

AK ID=Dot16KDF(AK,0b0000|PMK SN|AMSID or
    MS MAC Address|ABSID|"AKID,64)

According to an AK derivation formula, an AMSID or an MS MAC address can be used.

Referring to FIGS. 3 and 4 again, the terminal generates a CMAC value using a CMAC-TEK key derived from a CMAC-TEK prekey and transmits an RNG-REQ message together with the CMAC value to the BS in block 310. In block 408, the ES verifies the RNG-REQ message by comparing a CMAC value generated using a CMAC key derived from the CMAC-TEK prekey with the CMAC value attached to the RNG-REQ message.

The operations according to the afore-described embodiments can be implemented by providing memories that stores program codes corresponding to the operations in the BS and the terminal. That is, the BS and the terminal perform the operations by reading the program codes from the memories through a processor or a Central Processing Unit (CPU) and executing the program codes. Specifically, both or either of the ES and the terminal is configured so as to perform short data burst encryption/decryption according to the embodiments of the present disclosure.

Figure 7:
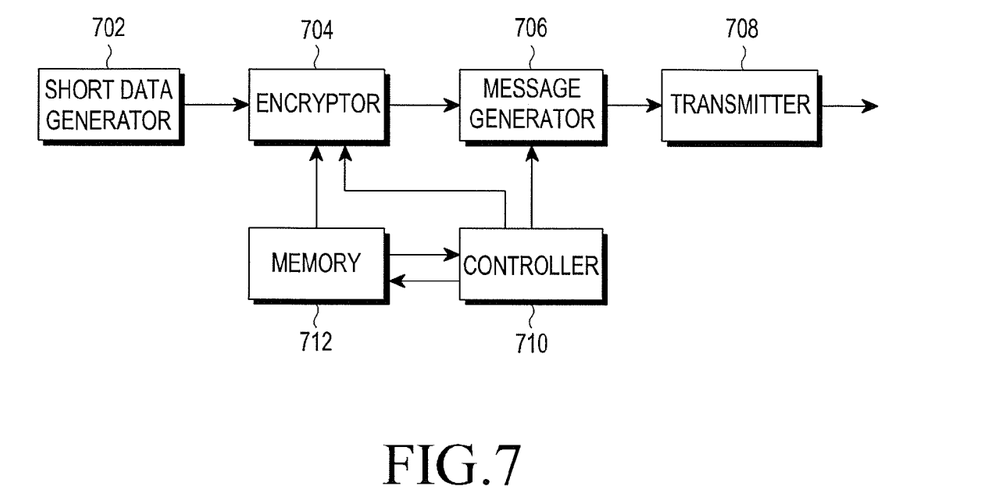
FIG. 7 illustrates a terminal for encrypting a short data according to an embodiment of the present disclosure.

FIG. 7 is a block diagram of a terminal for encrypting a short data according to an embodiment of the present disclosure. While components of the terminal are shown in FIG. 7 as separately configured, a plurality of components can be incorporated into a controller or a processor.

Referring to FIG. 7, a short data generator 702 generates a short data burst to be transmitted to the peer. An encryptor 704 encrypts the short data burst received from the short data generator 702 based on authorization-related parameters received from a memory 712 under the control of a controller 710. Specifically, the controller 710 determines whether to encrypt the short data burst according to a preliminary negotiation or a preset rule and controls the encryptor 704 according to the determination. The memory 712 stores authorization-related parameters acquired during initial network entry, including a CMACK-TEK prekey derived from an MSK and an AK by the controller 712 and provides the CMAC-TEK prekey to the encryptor 704 under the control of the controller 712.

The encryptor 704 generates a TEK needed for encryption of the short data burst using the CMAC-TEK prekey, constructs a nonce using the PN of a MAC PDU including an RNG-REQ message in which the short data burst is encapsulated, and encrypts the short data burst using the TEK and the nonce. The PN can be equal to a CMAC-PN_U included in the MAC PDU.

A message generator 706 constructs an RNG-REQ message including the short data burst encrypted by the encryptor 704 and generates a MAC PDU including a CMAC Digest with a CMAC value generated using the CMAC-TEK prekey. A transmitter 708 transmits the MAC PDU in a radio signal to the BS.

Figure 8:
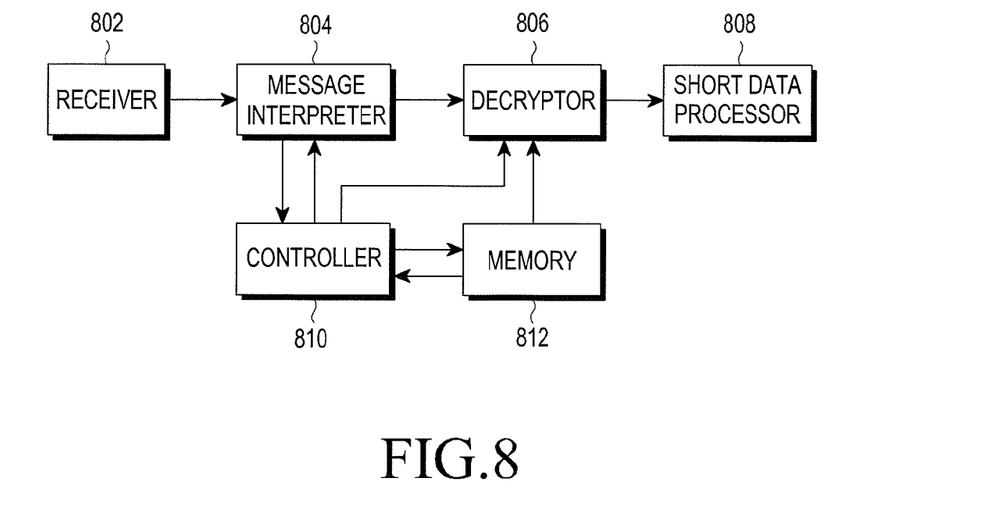
FIG. 8 illustrates a BS for decrypting a short data according to an embodiment of the present disclosure.

FIG. 8 is a block diagram of a BS for decrypting a short data according to an embodiment of the present disclosure. While components of the BS are shown in FIG. 8 as separately configured, a plurality of components can be incorporated into a controller or a processor.

Referring to FIG. 8, a receiver 802 receives a MAC PDU including an RNG-REQ message in a radio signal. A message interpreter 804 parses a MAC header, the RNG-REQ message, and a CMAC Digest from the MAC PDU received from the receiver 802 and interprets them. Especially, the message interpreter 804 interprets the RNG-REQ message under the control of a controller 810 and extracts a short data burst from the RNG-REQ message.

A decryptor 806 decrypts the encrypted short data burst received from the message interpreter 804 based on authorization-related parameters received from a memory 812 under the control of the controller 810. Specifically, the controller 810 determines whether to decrypt the short data burst according to an encryption indicator included in the RNG-REQ message and controls the decryptor 806 according to the determination. In addition, the controller 810 acquires an AK context for authenticating the terminal from an authenticator according to information included in the RNG-REQ message, derives a CMAC-TEK prekey based on the AK context, and stores the CMAC-TEK prekey in the memory 812. The decryptor 806 generates the same TEK as used for encrypting the short data burst in the terminal using the CMAC-TEK prekey received from the memory 812, constructs a nonce using a CMAC-PN_U attached to the RNG-REQ message, and decrypts the encrypted short data burst using the TEK and the nonce. A short data processor 808 performs a necessary operation including display or output of the decrypted short data burst on a display.

As is apparent from the above description, because short data to be transmitted from an idle-mode terminal is encrypted according to the present disclosure, the terminal can transmit important information securely. Especially, the short data is encrypted using authorization-related parameters already known to both a BS and the terminal in a known encryption scheme without using additional parameters. Therefore, security is provided to the short data without increasing system and signaling overhead.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for encrypting short data at a terminal in a wireless communication system, the method comprising:
generating a short data burst in idle mode;
generating a Traffic Encryption Key (TEK) based on a Cipher-based Message Authentication Code (CMAC)-TEK prekey derived from an Authorization Key (AK);
constructing, by the terminal, a nonce based on a Packet Number (PN) which is the same value as an uplink CMAC PN (CMAC-PN_U) to be sent with a Ranging Request (RNG-REQ) message;
encrypting the short data burst based on the TEK and the nonce;
generating a Medium Access Control (MAC) Protocol Data Unit (PDU) that includes a MAC header, the encrypted short data burst, and a CMAC digest; and
transmitting the MAC PDU to a base station (BS).

2. The method of claim 1, wherein the RNG-REQ message comprises the encrypted short data burst, and the CMAC digest comprises the CMAC-PN_U.

3. The method of claim 2, wherein the RNG-REQ message includes a ranging purpose indication field indicating that the RNG-REQ message is transmitted for idle-mode location update, a CMAC indicator indicating whether the RNG-REQ message is protected by a CMAC, and the encrypted short data burst.

4. The method of claim 3, wherein the RNG-REQ message includes an encryption indicator indicating whether the short data burst included in the RNG-REQ message is encrypted.

5. The method of claim 1, wherein the nonce includes a length of the short data burst, a Station Identifier (STID), a Flow ID (FID), a predetermined number of 0s, and the CMAC-PN_U.

6. The method of claim 1, further comprising:
generating a Pairwise Master Key (PMK) by truncating a Master Session Key (MSK) acquired during the initial network entry;
generating the AK for the SA between the terminal and the BS using the PMK, an address of the terminal, and an ID of the BS; and
generating the CMAC-TEK prekey using the AK,
wherein the TEK generation comprises generating the TEK using the CMAC-TEK prekey, an SA Identification (SAID) of the SA between the terminal and the BS, and a TEK counter value for the TEK, and
wherein the SAID and the TEK counter value are preset.

7. The method of claim 1, wherein the short data burst is a Short Messaging Service (SMS) payload.

8. A method for decrypting short data at a Base Station (BS) in a wireless communication system, the method comprising:
receiving, from a terminal, a Medium Access Control (MAC) Protocol Data Unit (PDU) that includes a MAC header, an encrypted short data burst and a Cipher-based Message Authentication Code (CMAC) Digest;
generating a Traffic Encryption Key (TEK) based on a CMAC-TEK prekey derived from an Authorization Key (AK);
constructing a nonce based on a PN being the same value as an Uplink CMAC PN (CMAC-PN_U) included in the CMAC Digest; and
decrypting the encrypted short data burst based on the TEK and the nonce.

9. The method of claim 8, wherein the MAC PDU comprises a Ranging Request (RNG-REQ) message including the encrypted short data burst, and the CMAC digest comprises the CMAC-PN_U.

10. The method of claim 9, wherein the RNG-REQ message includes a ranging purpose indication field indicating that the RNG-REQ message is transmitted for idle-mode location update, and a CMAC indicator indicating whether the RNG-REQ message is protected by a CMAC, and the encrypted short data burst.

11. The method of claim 9, wherein the RNG-REQ message includes an encryption indicator indicating whether the short data burst included in the RNG-REQ message is encrypted.

12. The method of claim 8, wherein the nonce includes a length of the short data burst, a Station Identifier (STID), a Flow ID (FID), a predetermined number of 0s, and the CMAC-PN_U.

13. The method of claim 8, further comprising:
generating a Pairwise Master Key (PMK) by truncating a Master Session Key (MSK) acquired in relation to the SA;
generating the AK for the SA between the terminal and the BS using the PMK, an address of the terminal, and an ID of the BS; and
generating the CMAC-TEK prekey using the AK,
wherein the TEK generation comprises generating the TEK using the CMAC-TEK prekey, an SA Identification (SAID) of the SA between the terminal and the BS, and a TEK counter value for the TEK, and
wherein the SAID and the TEK counter value are preset.

14. The method of claim 8, wherein the short data burst is a Short Messaging Service (SMS) payload.

15. A terminal apparatus for encrypting short data in a wireless communication system, the terminal apparatus comprising:
at least one processor configured to generate a short data burst in idle mode to generate a Traffic Encryption Key (TEK) based on a Cipher-based Message Authentication Code (CMAC)-TEK prekey derived from an Authorization Key (AK), construct a nonce based on a Packet Number (PN) which is the same value as an uplink CMAC PN (CMAC-PN_U) to be sent with a Ranging Request (RNG-REQ) message, and encrypt the short data burst based on the TEK and the nonce; and
a transmitter configured to transmit, to a base station (BS), a Medium Access Control (MAC) Protocol Data Unit (PDU) that includes a MAC header, the encrypted short data burst, and a CMAC digest.

16. The terminal apparatus of claim 15, wherein the RNG-REQ message comprises the encrypted short data burst, and the CMAC digest comprises the CMAC-PN_U.

17. The terminal apparatus of claim 16, wherein the RNG-REQ message includes a ranging purpose indication field configured to indicate that the RNG-REQ message is transmitted for idle-mode location update, a CMAC indicator configured to indicate whether the RNG-REQ message is protected by a CMAC, and the encrypted short data burst.

18. The terminal apparatus of claim 16, wherein the RNG-REQ message includes an encryption indicator configured to indicate whether the short data burst included in the RNG-REQ message is encrypted.

19. The terminal apparatus of claim 15, wherein the nonce includes a length of the short data burst, a Station Identifier (STID), a Flow ID (FID), a predetermined number of 0s, and the CMAC-PN_U.

20. The terminal apparatus of claim 15, wherein the at least one processor is further configured to generate a Pairwise Master Key (PMK) by truncating a Master Session Key (MSK) acquired during the initial network entry, generating the AK for the SA between the terminal and the BS using the PMK, an address of the terminal, and an ID of the BS, and generating the CMAC-TEK prekey using the AK,     wherein the TEK is generated by using the CMAC-TEK prekey, an SA Identification (SAID) of the SA between the terminal and the BS, and a TEK counter value for the TEK, and     wherein the SAID and the TEK counter value are preset.

21. The terminal apparatus of claim 15, wherein the short data burst is a Short Messaging Service (SMS) payload.

22. A Base Station (BS) apparatus for decrypting short data in a wireless communication system, the BS apparatus comprising:

a receiver configured to receive, from a terminal, a Medium Access Control (MAC) Protocol Data Unit (PDU) that includes a MAC header, an encrypted short data burst, and a Cipher-based Message Authentication Code (CMAC) Digest; and     at least one processor configured to generate a Traffic Encryption Key (TEK) based on a CMAC-TEK prekey derived from an Authorization Key (AK), construct a nonce based on a PN being the same value as an Uplink CMAC PN (CMAC-PN_U) included in the CMAC Digest, and decrypt the encrypted short data burst based on the TEK and the nonce.

23. The BS apparatus of claim 22, wherein the MAC PDU comprises a Ranging Request (RNG-REQ) message including the encrypted short data burst, and the CMAC digest comprises the CMAC-PN_U.

24. The BS apparatus of claim 23, wherein the RNG-REQ message includes a ranging purpose indication field configured to indicate that the RNG-REQ message is transmitted for idle-mode location update, a CMAC indicator configured to indicate whether the RNG-REQ message is protected by a CMAC, and the encrypted short data burst.

25. The BS apparatus of claim 23, wherein the RNG-REQ message includes an encryption indicator configured to indicate whether the short data burst included in the RNG-REQ message is encrypted.

26. The BS apparatus of claim 22, wherein the nonce includes a length of the short data burst, a Station Identifier (STID), a Flow ID (FID), a predetermined number of 0s, and the CMAC-PN_U.

27. The BS apparatus of claim 22, wherein the at least one processor is further configured to generate a Pairwise Master Key (PMK) by truncating a Master Session Key (MSK) acquired in relation to the SA, generating the AK for the SA between the terminal and the BS using the PMK, an address of the terminal, and an ID of the BS, and generating the CMAC-TEK prekey using the AK, wherein the TEK is generated by using the CMAC-TEK prekey, an SA Identification (SAID) of the SA between the terminal and the BS, and a TEK counter value for the TEK, and     wherein the SAID and the TEK counter value are preset.

28. The BS apparatus of claim 22, wherein the short data burst is a Short Messaging Service (SMS) payload.

\* \* \* \* \*